US011306221B2

(12) United States Patent
Elleithy et al.

(10) Patent No.: US 11,306,221 B2
(45) Date of Patent: Apr. 19, 2022

(54) ADDITIVELY MANUFACTURED ARTICLE AND METHOD

(71) Applicant: SHPP Global Technologies B.V., Bergen op Zoom (NL)

(72) Inventors: Rabeh Hosny Elleithy, Pittsfield, MA (US); Manojkumar Chellamuthu, Mt. Vernon, IN (US); Alex R. Delaney, Pittsfield, MA (US); Paul Dean Sybert, Evansville, IN (US); Kim Loan Thi Ly, Pittsfield, MA (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/418,907

(22) PCT Filed: Mar. 25, 2020

(86) PCT No.: PCT/US2020/024649
§ 371 (c)(1),
(2) Date: Jun. 28, 2021

(87) PCT Pub. No.: WO2020/226774
PCT Pub. Date: Nov. 12, 2020

(65) Prior Publication Data
US 2022/0089900 A1 Mar. 24, 2022

(30) Foreign Application Priority Data

May 7, 2019 (EP) ..................................... 19172957

(51) Int. Cl.
| | | |
|---|---|---|
| *C09D 169/00* | (2006.01) | |
| *B33Y 10/00* | (2015.01) | |
| *B29C 64/118* | (2017.01) | |
| *B33Y 70/00* | (2020.01) | |
| *B29K 105/16* | (2006.01) | |
| *B29K 69/00* | (2006.01) | |

(52) U.S. Cl.
CPC .......... *C09D 169/00* (2013.01); *B29C 64/118* (2017.08); *B33Y 10/00* (2014.12); *B33Y 70/00* (2014.12); *B29K 2069/00* (2013.01); *B29K 2105/16* (2013.01)

(58) Field of Classification Search
CPC ...... C09D 169/00; B33Y 10/00; B33Y 70/00; B29C 64/118; B29K 2069/00; B29K 2105/16
USPC ....................................................... 428/412
See application file for complete search history.

(56) References Cited

U.S. PATENT DOCUMENTS

| | | |
|---|---|---|
| 3,419,634 A | 12/1968 | Vaughn |
| 3,419,635 A | 12/1968 | Vaughn |
| 3,635,895 A | 1/1972 | Kramer |
| 3,821,325 A | 6/1974 | Merritt, Jr. et al. |
| 3,832,419 A | 8/1974 | Merritt, Jr. |
| 4,001,184 A | 1/1977 | Scott |
| 5,344,910 A | 9/1994 | Sybert |
| 6,072,011 A | 6/2000 | Hoover |
| 9,120,893 B1 | 9/2015 | Chandra et al. |
| 2016/0122534 A1 | 5/2016 | Zhou et al. |
| 2016/0144563 A1 | 5/2016 | Elliott |
| 2016/0272812 A1 | 9/2016 | Zhou et al. |
| 2017/0057160 A1 | 3/2017 | Duty et al. |
| 2017/0157845 A1 | 6/2017 | Bihari et al. |
| 2017/0326798 A1 | 11/2017 | Choi et al. |
| 2018/0155481 A1 | 6/2018 | Share et al. |
| 2018/0371249 A1 | 12/2018 | Bihari et al. |
| 2019/0193336 A1 | 6/2019 | Sybert et al. |

FOREIGN PATENT DOCUMENTS

| | | |
|---|---|---|
| CN | 104893224 A | 9/2015 |
| WO | 2015048735 A1 | 4/2015 |
| WO | 2015195527 A1 | 12/2015 |
| WO | 2017191150 A1 | 11/2017 |

OTHER PUBLICATIONS

International Search Report dated Jul. 7, 2020; International Application No. PCT/US2020/024649; International Filing Date Mar. 25, 2020 (5 pgs).
Written Opinion dated Jul. 7, 2020; International Application No. PCT/US2020/024649; International Filing Date Mar. 25, 2020 (7 pgs.).
Kishore, et al. "Infrared Preheating to Improve Interlayer Strength of Big Area Additive Manufacturing (BAAM) Components" Additive Manufacturing 14 (2017) 7-12.

*Primary Examiner* — Edward J Cain
(74) *Attorney, Agent, or Firm* — Cantor Colburn LLP

(57) ABSTRACT

An article includes at least two contiguous layers containing a composition that includes a branched polycarbonate, optionally a linear carbonate-containing polymer, and 0 to less than 5 weight percent filler. The composition is characterized by an average mole percent branching of 0.06 to 2.4 mole percent, which is calculated as 100 times moles of branched carbonate units in the branched polycarbonate divided by the sum of moles of linear carbonate units in the branched polycarbonate and the optional linear carbonate-containing polymer. The composition is further characterized by a melt flow rate of 1 to 20 grams per 10 minutes, determined according to ASTM D1238-13 at 300° C. and 1.2 kilogram load. Also described is a method of additive manufacturing utilizing the composition.

14 Claims, 2 Drawing Sheets

ADDITIVELY MANUFACTURED ARTICLE AND METHOD

CROSS-REFERENCE TO RELATED APPLICATIONS

This application is a National Stage application of PCT/US2020/024649, filed Mar. 25, 2020, which claims the benefit of European Application No. 19172957.3, filed May 7, 2019, both of which are incorporated by reference herein in their entirety.

BACKGROUND OF THE INVENTION

Using additive manufacturing, three-dimensional parts can be fabricated with layer-by-layer deposition or "printing" of a thermoplastic composition. The method utilizes a computer-controlled moving extrusion head to form a series of layers, each layer being formed by extrusion of molten thermoplastic composition onto the underlying layer. The thermoplastic composition must have a combination of properties that allow it to be extruded in a molten form, to adhere to the layer onto which it is extruded, to adhere to the subsequent layer, and to rapidly have sufficient dimensional stability to accept the subsequent layer without physical deformation. One way of improving rapid dimensional stability is to incorporate a reinforcing filler, such as glass fiber or carbon fiber, into the thermoplastic composition. However, the addition of reinforcing filler can reduce interlayer adhesion, so that the resulting printed part exhibits insufficient interlayer adhesion for some applications. There is therefore a need for additive manufacturing compositions, articles, and methods capable of providing rapid dimensional stability without compromising interlayer adhesion.

BRIEF SUMMARY OF EMBODIMENTS OF THE INVENTION

One embodiment is an article, comprising: at least two contiguous layers; wherein the at least two contiguous layers comprise a composition comprising, based on the total weight of the composition, 10 to 100 weight percent of a branched polycarbonate; and 0 to 90 weight percent of a linear carbonate-containing polymer selected from the group consisting of linear polycarbonates, linear polycarbonate-polysiloxanes, and combinations thereof; and further comprising, based on the total volume of the composition, 0 to less than 5 volume percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

Another embodiment is a method of additive manufacturing, the method comprising: converting a composition from a solid form to a molten form, wherein the composition is characterized by a glass transition temperature, and the molten form has a temperature 70 to 250° C. above the glass transition temperature; extruding the molten form to form a first molten extrusion; depositing the first molten extrusion in a predetermined pattern to form a first layer; further extruding the molten form to form a second molten extrusion; and depositing the second molten extrusion in a predetermined pattern to form a second layer having a lower surface in contact with an upper surface of the first layer, wherein the composition comprises, based on the total weight of the composition, 10 to 100 weight percent of a branched polycarbonate; and 0 to 90 weight percent of a linear carbonate-containing polymer selected from the group consisting of linear polycarbonates, linear polycarbonate-polysiloxanes, and combinations thereof; and further comprising, based on the total volume of the composition, 0 to less than 5 volume percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

These and other embodiments are described in detail below.

DETAILED DESCRIPTION OF THE INVENTION

Figure 1:
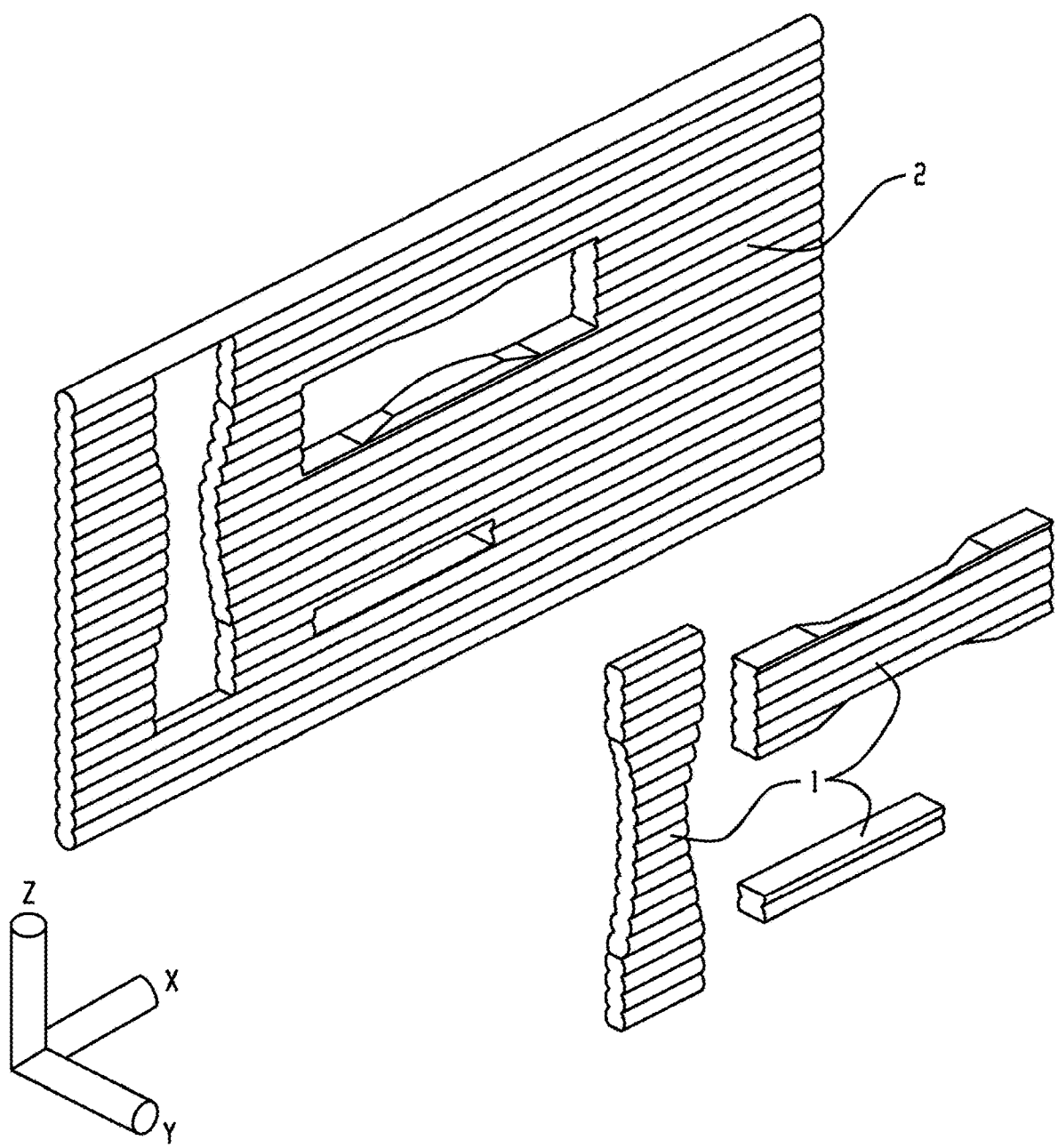
FIG. 1 illustrates the orientations of tensile property test specimens 1 relative to printed article 2 from which they are cut.

The present inventors have determined that a desirable combination of rapid dimensional stability and strong interlayer adhesion is provided by a specific thermoplastic composition that incorporates a branched polycarbonate in an amount effective to provide the composition as a whole with an average mole percent branching of 0.06 to 2.4 mole percent, and a melt flow rate of 1 to 20 grams per 10 minutes measured at 300° C. and 1.2 kilogram load.

Thus, one embodiment is an article, comprising: at least two contiguous layers; wherein the at least two contiguous layers comprise a composition comprising, based on the total weight of the composition, 10 to 100 weight percent of a branched polycarbonate; and 0 to 90 weight percent of a linear carbonate-containing polymer selected from the group consisting of linear polycarbonates, linear polycarbonate-polysiloxanes, and combinations thereof; and further comprising, based on the total volume of the composition, 0 to less than 5 volume percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

The article comprises at least two contiguous layers, each layer comprising the same composition. In some embodiments, the article comprises at least five contiguous layers, or at least ten contiguous layers.

The composition comprises a branched polycarbonate. As used herein, the term branched polycarbonate refers to a polymer comprising 95 to 99.95 mole percent linear (divalent) carbonate units and 0.05 to 5 mole percent branched carbonate units having a valence of at least three. In the context of the branched polycarbonate, mole percent branching is calculated as 100 times moles of branched carbonate units divided by the sum of moles of branched carbonate units and moles of linear carbonate units. Within the range of 95 to 99.95, the mole percent linear carbonate units can be 97 to 99.9 mole percent, or 98 to 99.9 mole percent, or 99 to 99.8 mole percent. Within the range of 0.05 to 5, the mole percent branched carbonate units can be 0.1 to 3 mole percent, or 0.1 to 2 mole percent, or 0.2 to 1 mole percent.

The linear carbonate units have the structure

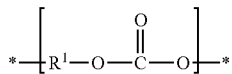

wherein at least 60 percent of the total number of $R^1$ groups are aromatic divalent groups. In some embodiments, the aromatic divalent groups are $C_6$-$C_{24}$ aromatic divalent groups. When not all $R^1$ groups are aromatic, the remainder are $C_2$-$C_{24}$ aliphatic divalent groups. In some embodiments, each $R^1$ is a radical of the formula

wherein each of $A^1$ and $A^2$ is independently a monocyclic divalent aryl radical and $Y^1$ is a bridging radical in which one or two atoms separate $A^1$ from $A^2$. Examples of $A^1$ and $A^2$ include 1,3-phenylene and 1,4-phenylene, each optionally substituted with one, two, or three $C_1$-$C_6$ alkyl groups. In some embodiments, one atom separates $A^1$ from $A^2$. Examples of $Y^1$ are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. In some embodiments, $Y^1$ is a $C_1$-$C_{12}$ (divalent) hydrocarbylene group. As used herein, the term "hydrocarbyl", whether used by itself, or as a prefix, suffix, or fragment of another term, refers to a residue that contains only carbon and hydrogen, unless it is specifically identified as "substituted hydrocarbyl". The hydrocarbyl residue can be aliphatic or aromatic, straight-chain or cyclic or branched, and saturated or unsaturated. It can also contain combinations of aliphatic, aromatic, straight chain, cyclic, branched, saturated, and unsaturated hydrocarbon moieties. When the hydrocarbyl residue is described as substituted, it includes one or more substituents such as, for example, halogen (i.e., F, Cl, Br, I), hydroxyl, amino, thiol, carboxyl, carboxylate, amide, nitrile, sulfide, disulfide, nitro, $C_1$-$C_{18}$ alkyl, $C_1$-$C_{18}$ alkoxyl, $C_6$-$C_{18}$ aryl, $C_6$-$C_{18}$ aryloxyl, $C_7$-$C_{18}$ alkylaryl, or $C_7$-$C_{18}$ alkylaryloxyl. So, when the hydrocarbyl residue is described as substituted, it can contain heteroatoms in addition to carbon and hydrogen.

Examples of $Y^1$ include methylene (—CH$_2$—; also known as methylidene), ethylidene (—CH(CH$_3$)—), isopropylidene (—C(CH$_3$)$_2$—), and cyclohexylidene. In some embodiments, the divalent carbonate unit is free of alkoxyl substituents.

The branched carbonate unit has a valence of at least three, which means that it has at least three points of connection to the rest of the branched polycarbonate. In some embodiments, the branched carbonate unit has a valence of three, four, or five. In some embodiments, the branched carbonate unit has a valence of three or four. In some embodiments, the branched carbonate unit has a valence of three. The branched carbonate unit comprises the residue of a branching agent. The branching agent includes at least three functional groups, each functional group being independently selected from the group consisting of hydroxyl, carboxyl, carboxylic anhydride, and haloformyl. Suitable branching agents include trimellitic acid, trimellitic anhydride, trimellitic trichloride, 1,1,1-tris(p-hydroxyphenyl)ethane (THPE), 1,3,5-tris(2-(p-hydroxyphenyl)-prop-2-yl)benzene, 4-[2-[4-[1,1-bis(4-hydroxyphenyl)ethyl]phenyl]propan-2-yl]phenol, 4-chloroformyl phthalic anhydride, trimesic acid, and benzophenone tetracarboxylic acid. In some embodiments, the branching agent comprises 1,1,1-tris(p-hydroxyphenyl)ethane (THPE).

There is no particular limit on the structure of end groups on the branched polycarbonate. Monofunctional chain terminating agents (also referred to as a chain stopping agents) can be included during polymerization to provide end groups on the branched polycarbonate. Examples of chain terminating agents include monocyclic phenols such as phenol, p-cyanophenol, and $C_1$-$C_{22}$ alkyl-substituted phenols such as p-cumylphenol and p-tertiary-butyl phenol; monoethers of aromatic diols, such as p-methoxyphenol; monoesters of aromatic diols, such as resorcinol monobenzoate; monochloroformates, such as phenyl chloroformate, p-cumylphenyl chloroformate, and p-tolyl chloroformate. Combinations of different end groups can be used. In some embodiments, the branched polycarbonate has a weight average molecular weight of 15,000 to 50,000 grams/mole, determined by gel permeation chromatography using bisphenol A polycarbonate standards. Within this range, the weight average molecular weight can be 20,000 to 40,000 grams/mole. Procedures for making branched polycarbonates are known in the art and described, for example, in U.S. Pat. No. 3,635,895 to Kramer, and U.S. Pat. No. 4,001,184 to Scott.

The composition comprises the branched polycarbonate in an amount effective to provide the composition as a whole with an average mole percent branching of 0.06 to 2.4 mole percent. Within the range of 0.06 to 2.4 mole percent, the average mole percent branching can be 0.1 to 2 mole percent, or 0.2 to 1.5 mole percent. In the context of the composition as a whole, average mole percent branching is calculated as 100 times moles of branched carbonate units in the branched polycarbonate divided by the sum of moles of linear carbonate units in the branched polycarbonate and moles of linear carbonate units in the linear carbonate-containing polymer, if present. An illustrative calculation of average mole percent branching is included in the working examples below.

The composition comprises the branched polycarbonate in an amount of 10 to 100 weight percent, based on the total weight of the composition. Within this range, the branched polycarbonate amount can be 10 to 95 weight percent, or 20 to 90 weight percent, or 30 to 80 weight percent.

In addition to the branched polycarbonate, the composition can, optionally, further comprise a linear carbonate-containing polymer. The linear carbonate-containing polymer can be a linear polycarbonate, a linear polycarbonate-polysiloxane, or a combination thereof.

The linear carbonate-containing polymer can be a linear polycarbonate. A linear polycarbonate is a linear polymer comprising carbonate units having the structure

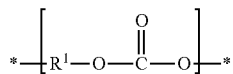

wherein at least 60 percent of the total number of $R^1$ groups are aromatic. In some embodiments, the aromatic divalent groups are $C_6$-$C_{24}$ aromatic divalent groups. When not all $R^1$ groups are aromatic, the remainder are $C_2$-$C_{24}$ aliphatic divalent groups. In some embodiments, each $R^1$ is a radical of the formula

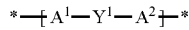

wherein each of $A^1$ and $A^2$ is independently a monocyclic divalent aryl radical and $Y^1$ is a bridging radical having one or two atoms that separate $A^1$ from $A^2$. Examples of $A^1$ and $A^2$ include 1,3-phenylene and 1,4-phenylene, each optionally substituted with one, two, or three $C_1$-$C_6$ alkyl groups. In some embodiments, one atom separates $A^1$ from $A^2$. Illustrative examples of radicals of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a $C_1$-$C_{12}$ (divalent) hydrocarbylene group. Examples of $Y^1$ include methylene (—CH$_2$—; also known as methylidene), ethylidene (—CH(CH$_3$)—), isopropylidene (—C(CH$_3$)$_2$—), and cyclohexylidene. In some embodiments, the linear polycarbonate is a linear bisphenol A polycarbonate comprising carbonate units having the structure

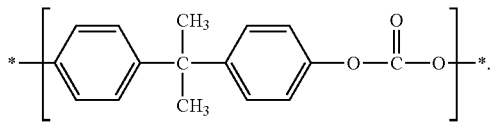

The linear carbonate-containing polymer can be a linear polycarbonate-polysiloxane. A linear polycarbonate-polysiloxane is a linear polymer comprising at least one polycarbonate block and at least one polysiloxane block. In some embodiments, the linear polycarbonate-polysiloxane comprises multiple polycarbonate blocks and multiple polysiloxane blocks. The at least one polycarbonate block comprises carbonate units of the formula

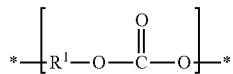

wherein at least 60 mole percent of the total number of $R^1$ groups are aromatic divalent groups. In some embodiments, the aromatic divalent groups are $C_6$-$C_{24}$ aromatic divalent groups. When not all $R^1$ groups are aromatic divalent groups, the remainder are $C_2$-$C_{24}$ aliphatic divalent groups. In some embodiments, each $R^1$ is a radical of the formula

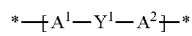

wherein $A^1$, $A^2$, and $Y^1$ are defined as above. In a specific embodiment, the at least one polycarbonate block comprises bisphenol A carbonate units. The at least one polysiloxane block comprises diorganosiloxane units of the formula

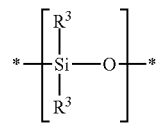

wherein each occurrence of $R^3$ is independently $C_1$-$C_{13}$ hydrocarbyl. Examples of suitable hydrocarbyl groups include $C_1$-$C_{13}$ alkyl (including alkyl groups that are linear, branched, cyclic, or a combination of at least two of the foregoing), $C_2$-$C_{13}$ alkenyl, $C_6$-$C_{12}$ aryl $C_7$-$C_{13}$ arylalkyl, and $C_7$-$C_{13}$ alkylaryl. The foregoing groups can be fully or partially halogenated with fluorine, chlorine, bromine, or iodine, or a combination thereof. In some embodiments, each occurrence of $R^3$ is methyl. The at least one polysiloxane block can comprise 5 to 500 diorganosiloxane units. Within this range, the number of diorganosiloxane units can be 5 to 200, or 10 to 100.

In some embodiments, the at least one polysiloxane block has the formula

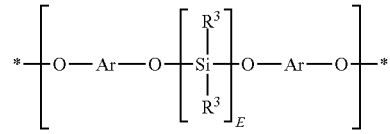

wherein $R^3$ is defined above; E is 5 to 500, or 10 to 100; and each occurrence of Ar is independently an unsubstituted or substituted $C_6$-$C_{30}$ arylene group, wherein aromatic carbon atoms of the arylene group are directly bonded to each adjacent oxygen atom. Ar groups can be derived from a $C_6$-$C_{30}$ dihydroxyarylene compound, for example a dihydroxyarylene compound of formula

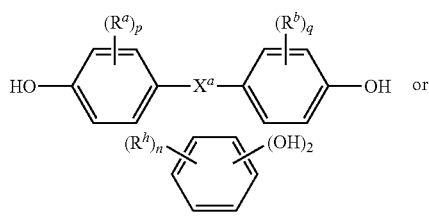

wherein n, p, and q are independently 0, 1, 2, 3, or 4; $R^a$, $R^b$, and $R^h$ are independently at each occurrence halogen, or unsubstituted or substituted $C_{1-10}$ hydrocarbyl; and $X^a$ is a single bond, —O—, —S—, —S(O)—, —S(O)$_2$—, —C(O)—, or a C$_{1-18}$ hydrocarbylene, which can be cyclic or acyclic, aromatic or non-aromatic, and can optionally comprise one or more heteroatoms selected from halogen, oxygen, nitrogen, sulfur, silicon, or phosphorus. Examples of dihydroxyarylene compounds include hydroquinone, resorcinol, 1,1-bis(4-hydroxyphenyl)methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane.

In some embodiments in which Ar is derived from resorcinol, the at least one polysiloxane block is derived from a polysiloxane bisphenol of the formula

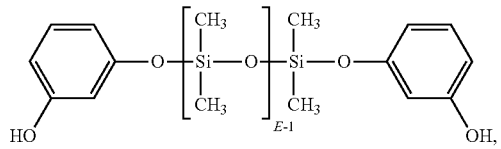

wherein E is defined above.

In some embodiments in which Ar is derived from bisphenol-A, the at least one polysiloxane block is derived from a polysiloxane bisphenol of the formula

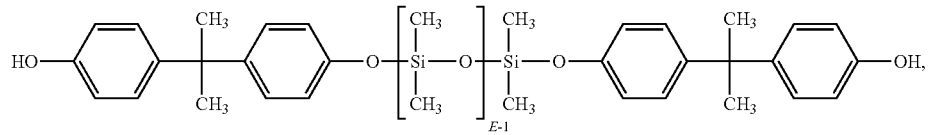

wherein E is defined above.

In some embodiments, the at least one polysiloxane block is derived from a polysiloxane bisphenol of the formula

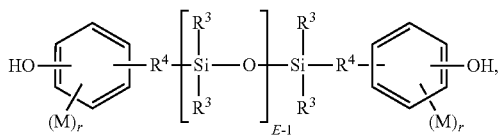

wherein R$^3$ and E are as defined above; each occurrence of R$^4$ is independently a C$_2$-C$_8$ divalent aliphatic group; each occurrence of M is independently a halogen, cyano, nitro, C$_1$-C$_8$ alkylthio, C$_1$-C$_8$ alkyl, C$_1$-C$_8$ alkoxy, C$_2$-C$_8$ alkenyl, C$_2$-C$_8$ alkenyloxy group, C$_3$-C$_8$ cycloalkyl, C$_3$-C$_8$ cycloalkoxy, C$_6$-C$_{10}$ aryl, C$_6$-C$_{10}$ aryloxy, C$_7$-C$_{12}$ arylalkyl, C$_7$-C$_{12}$ arylalkoxy, C$_7$-C$_{12}$ alkylaryl, or C$_7$-C$_{12}$ alkylaryloxy; and each occurrence of r is independently 0, 1, 2, 3, or 4.

In some embodiments, the polycarbonate-polysiloxane comprises, based on the weight of the polycarbonate-polysiloxane, 70 to 97 weight percent carbonate units and 3 to 30 weight percent diorganosiloxane units. Within this range, the polycarbonate-polysiloxane can comprise 70 to 90 weight percent carbonate units and 10 to 30 weight percent diorganosiloxane units, or 75 to 85 weight percent carbonate units and 15 to 25 weight percent diorganosiloxane units.

In some embodiments, the polycarbonate-polysiloxane has a weight average molecular weight of 2,000 to 100,000 grams/mole, specifically 5,000 to 50,000 grams/mole, as determined by gel permeation chromatography using bisphenol A polycarbonate standards.

Polycarbonate-polysiloxanes and methods for their preparation are known and described, for example, in U.S. Pat. Nos. 3,419,634 and 3,419,635 to Vaughn, U.S. Pat. No. 3,821,325 to Merritt et al., U.S. Pat. No. 3,832,419 to Merritt, and U.S. Pat. No. 6,072,011 to Hoover.

The composition comprises the linear carbonate-containing polymer in an amount of 0 to 90 weight percent, based on the total weight of the composition. Within this range, the amount of linear carbonate-containing polymer can be 10 to 80 weight percent, or 20 to 70 weight percent.

The composition comprises 70 to 100 weight percent total of the branched polycarbonate and the linear carbonate-containing polymer, based on the total weight of the composition. Within this range, the total amount of branched polycarbonate and linear carbonate-containing polymer can be 90 to 100 weight percent, or 95 to 100 weight percent, or 97 to 100 weight percent, or 98 to 100 weight percent, or 99 to 100 weight percent.

In addition to the branched polycarbonate and the optional linear carbonate-containing polymer, the composition can, optionally, further comprise one or more additional linear polymers compatible with the branched polycarbonate. Suitable additional linear polymers include, for example, linear polyesters, linear polyestercarbonates, linear polyestercarbonate-polysiloxanes, linear polyetherimides, linear polyetherimide-polysiloxanes, linear acrylonitrile-butadiene-styrene terpolymers, and combinations thereof.

When present, the additional linear polymer can be used in an amount of 2 to 30 weight percent, based on the total weight of the composition. Within this range, the amount of additional linear polymer can be 5 to 25 weight percent.

The composition can, optionally, further comprise one or more additives known in the thermoplastics art. For example, the composition can, optionally, further comprise an additive chosen from stabilizers, lubricants, processing aids, drip retardants, nucleating agents, UV blockers, dyes, pigments, antioxidants, anti-static agents, mineral oil, metal deactivators, antiblocking agents, flame retardants, and combinations thereof. When present, such additives are typically used in a total amount of less than or equal to 5 weight percent, or less than or equal to 2 weight percent, or less than or equal to 1 weight percent, based on the total weight of the composition.

One advantage of the present article and method is that the composition comprises little or no filler. Specifically, the composition comprises 0 to less than 5 volume percent filler. In some embodiments, the composition comprises 0 to 1 volume percent filler, or it entirely excludes filler. Examples of fillers include silicas (such as fused silicas and crystalline silicas), boron nitrides, boron silicates, aluminas, aluminum hydroxides, aluminum diborides, silicon carbides, magnesium oxides, wollastonites, calcium sulfates (such as calcium sulfate anhydrate, calcium dihydrate, and calcium trihydrate), calcium carbonates, calcium silicates, magnesium carbonates, iron oxides, aluminosilicates, talcs, glass spheres (both hollow and solid), kaolins, micas, nepheline syenite, flue dust, cenospheres, perlites, tripolis, diatomaceous earths, silicon carbides, molybdenum sulfides, zinc sulfides, and zirconium silicates, barium titanates, barium ferrites, barium sulfates, aluminum particles, aluminum fibers, bronze particles, bronze fibers, zinc particles, zinc fibers, copper particles, copper fibers, nickel particles, nickel fibers, steel particles, steel fibers, carbon blacks, graphites, carbon fibers (including carbon nanofibers having a diameter of 5 to 100 nanometers, and carbon fibers having a diameter of 1 to 20 micrometers), glass fibers (including fibers of E, A, C, ECR, R, S, D, and NE glasses), glass flakes, polyethylene fibers, polyester fibers, poly(vinyl alcohol) fibers, aromatic polyamide fibers, polybenzimidazole fibers, polybenzoxazole fibers, polyimide fibers (including polyetherimide fibers), poly(phenylene sulfide) fibers, poly(ether ketone) fibers, poly(ether ether ketone) fibers, polytetrafluoroethylene fibers, and combinations thereof.

In some embodiments, the composition excludes flame retardants.

The composition has a melt flow rate of 1 to 20 grams per 10 minutes, determined according to ASTM D1238-13 at 300° C. and 1.2 kilogram load. Within this range, the melt flow rate can be 2 to 20 grams per 10 minutes, or 4 to 20 grams per 10 minutes.

In a specific embodiment of the article, the composition comprises the branched polycarbonate and the linear polycarbonate; the composition comprises 0 to 5 weight percent total of polymers other than the branched polycarbonate and the linear polycarbonate; the composition is characterized by an average mole percent branching of 0.06 to 2 mole percent; and the composition comprises 0 to 1 volume percent filler.

In another specific embodiment of the article, the composition comprises the branched polycarbonate, the linear polycarbonate, and the linear polycarbonate-polysiloxane; the composition comprises 0 to 5 weight percent total of polymers other than the branched polycarbonate, the linear polycarbonate, and the linear polycarbonate-polysiloxane; the composition is characterized by an average mole percent branching of 0.06 to 2 mole percent; and the composition comprises 0 to 1 volume percent filler.

Another embodiment is a method of additive manufacturing, the method comprising: converting a composition from a solid form to a molten form, wherein the composition is characterized by a glass transition temperature, and the molten form has a temperature 70 to 250° C. above the glass transition temperature; extruding the molten form to form a first molten extrusion; depositing the first molten extrusion in a predetermined pattern to form a first layer; further extruding the molten form to form a second molten extrusion; and depositing the second molten extrusion in a predetermined pattern to form a second layer having a lower surface in contact with an upper surface of the first layer, wherein the composition comprises, based on the total weight of the composition, 10 to 100 weight percent of a branched polycarbonate; and 0 to 90 weight percent of a linear carbonate-containing polymer selected from the group consisting of linear polycarbonates, linear polycarbonate-polysiloxanes, and combinations thereof; and further comprising, based on the total volume of the composition, 0 to less than 5 volume percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

All of the variations described above in the context of the article apply as well to the method of additive manufacturing.

In some embodiments of the method, it is a large format additive manufacturing method. In these embodiments the method omits a fusing step. In contrast, a fusing step is typically required in fused filament fabrication methods. Another difference between large format additive manufacturing and fused filament fabrication is their melt flow requirements. Fused filament fabrication uses two types of materials simultaneously, a model material and a support material. The model (or build) material is used to print the three-dimensional part, and the support material, as the name indicates, is used to temporarily support the model material during printing. Thus, the support material is only needed until the printed part cools and develops enough strength be self-supporting. The model material remains in the final 3D printed part, whereas the support material is removed after printing is completed. The use of support material allows the fused filament fabrication process to use model materials that lack self-support properties during printing. In contrast, large format additive manufacturing uses only a model material and does not employ a support material. So, the model material must be self-supporting during printing. One way to characterize the self-support properties of a model material is via melt flow testing. Generally speaking, as melt flow increases, the model material becomes easier to print, but harder to support itself during printing. Therefore, it is preferable to use a model material with lower melt flow for large format additive manufacturing, while it is acceptable to use a model material with higher melt flow for fused filament fabrication. For example, as described above, the composition of the present invention is useful for large format additive manufacturing and can exhibit a melt flow rate of 1 to 20 grams per 10 minutes, determined according to ASTM D1238-13 at 300° C. and 1.2 kilogram load. This melt flow is substantially less than the range of 30 to 75 grams per 10 minutes at 300° C. and 1.2 kilogram load, which is associated with the build material used for fused filament fabrication in International Patent Application Publication No. WO 2015/195527 A1 of Bihari et al., published 23 Dec. 2015.

The method of additive manufacturing comprises converting a composition from a solid form to a molten form. In some embodiments, the solid form comprises pellets. In such embodiments, when the composition comprises the linear carbonate-containing polymer, the branched polycarbonate and the linear carbonate-containing polymer can be present in the same pellets or in different pellets.

The composition is characterized by a glass transition temperature, and the molten form has a temperature 70 to 250° C. above the glass transition temperature. Within this range, the molten form can have a temperature 70 to 200° C. above the glass transition temperature, or 70 to 150° C. above the glass transition temperature.

The method further comprises forming successive layers from the molten form. Specifically, successive layers are formed by extruding the molten form to form a first molten extrusion, depositing the first molten extrusion in a predetermined pattern to form a first layer, further extruding the molten form to form a second molten extrusion, and depositing the second molten extrusion in a predetermined pattern to form a second layer having a lower surface in contact with an upper surface of the first layer. In some embodiment of the method, during deposition of the second layer, the upper surface of the first layer has a temperature 20 to 200° C. above the glass transition temperature of the composition. Within this temperature range, the upper surface of the first layer can have a temperature 50 to 200° C., or 50 to 150° C. above the glass transition temperature of the composition. Infrared heating of the upper surface of the last printed layer can be used to achieve the upper surface temperature of 20 to 200° C. above the glass transition temperature while the next layer was deposited. The infrared heating can occur prior to and/or during the deposition of the next layer. For a description of the use of infrared heating during additive manufacturing, see, for example, V. Kishore et al., "Infrared preheating to improve interlayer strength of big area additive manufacturing (BAAM) components," *Additive Manufacturing*, Volume 14, March 2017, Pages 7-12.

In some embodiments, the method further comprises repeating the extruding and depositing steps at least three times, or at least five times, or at least ten times.

In the method, the composition comprises at least 70 weight percent total of the branched polycarbonate and the optional linear polycarbonate, based on the total weight of the composition. Within this limit, the total amount of branched polycarbonate and optional linear polycarbonate can be at least 90 weight percent, or at least 95 weight percent, or at least 97 weight percent, or at least 98 weight percent, or at least 99 weight percent.

In some embodiments of the method, the composition is characterized by an average mole percent branching of 0.06 to 2 mole percent.

In some embodiments of the method, the composition comprises 0 to 1 weight percent filler.

In a specific embodiment of the method, the composition comprises the branched polycarbonate and the linear polycarbonate; the composition comprises 0 to 5 weight percent total of polymers other than the branched polycarbonate and the linear polycarbonate; the composition is characterized by an average mole percent branching of 0.06 to 2 mole percent; and the composition comprises 0 to 1 volume percent filler.

In another specific embodiment of the method, the composition comprises the branched polycarbonate, the linear polycarbonate, and the linear polycarbonate-polysiloxane; the composition comprises 0 to 5 weight percent total of polymers other than the branched polycarbonate, the linear polycarbonate, and the linear polycarbonate-polysiloxane; the composition is characterized by an average mole percent branching of 0.06 to 2 mole percent; and the composition comprises 0 to 1 volume percent filler.

The invention is further illustrated by the following non-limiting examples.

EXAMPLES

Components used to prepare a first set of compositions are summarized in Table 1. Polymer molecular weights were determined by high performance liquid chromatography using bisphenol A polycarbonate standards. For individual polymer resins (as distinguished from the composition as a whole), mole percent branching values were calculated as 100 times moles of branching agent divided by total moles of dihydric phenol. For example, for a branched polycarbonate, mole percent branching is calculated as 100 times moles of branching agent (e.g., 1,1,1-tris(4-hydroxyphenyl) ethane (THPE)) divided by total moles of dihydric phenol (e.g., bisphenol A), wherein the branching agent and dihydric phenol are used to synthesize the branched polycarbonate. As another example, for a polyestercarbonate containing both carbonate and ester (i.e., arylate) units, mole percent branching is calculated as 100 times moles branching agent (e.g., 1,1,1-tris(4-hydroxyphenyl)ethane (THPE)) divided by total moles of dihydric phenol (e.g., moles of bisphenol A plus moles of resorcinol).

A representative procedure for forming a linear polycarbonate (i.e., a polycarbonate prepared without the use of a branching agent) is as follows. A mixture of methylene chloride (23 liters), deionized water (10 liters), bisphenol A (BPA, 4,500 grams), triethylamine (30 milliliters), and sodium gluconate (10 grams) was added to a 75 liter reactor equipped with mechanical stirrer, recirculation line with pH probe, subsurface phosgene inlet, chilled glycol condenser, sodium hydroxide scrubber for the exit gas, and sodium hydroxide solution inlet. Phosgene was added at 80 grams/minute for a total addition of about 2,200 grams. A solution of p-cumylphenol (125.5 grams in 250 milliliters of methylene chloride) was added to the reaction mixture starting after addition of 220 grams of phosgene and continuing for about 11 minutes. A 33 weight percent aqueous solution of sodium hydroxide was added as needed during the phosgenation to maintain a pH of 9-10. Then, an additional 200 grams of phosgene were added while the pH was maintained by addition of aqueous sodium hydroxide. The reactor was then purged with nitrogen and its contents transferred to a 100 liter work-up tank. The reaction mixture was purified on a centrifuge train where the brine phase was separated and the organic phase (including product polymer and methylene chloride) was extracted with aqueous hydrochloric acid and then washed with deionized water to remove ionic chlorides. The polymer was steam-precipitated from the resulting methylene chloride solution, and the precipitated polymer was dried under hot nitrogen. The p-cumylphenol amount was chosen to achieve a target weight average molecular weight of 28,000 to 32,000 grams/mole. A skilled person can adjust the p-cumylphenol amount to achieve a different target molecular weight.

A representative procedure for forming a branched polycarbonate (i.e., a polycarbonate incorporating a branching agent) is as follows. A mixture of methylene chloride (23 liters), deionized water (10 liters), BPA (4,500 grams), triethylamine (30 milliliters), THPE (25.3 grams in 30 grams of 33 weight percent aqueous NaOH and 75 grams of water) and sodium gluconate (10 grams) was added to a 75 liter reactor equipped with mechanical stirrer, recirculation line with pH probe, subsurface phosgene inlet, chilled glycol condenser, sodium hydroxide scrubber for the exit gas, and sodium hydroxide solution inlet. Phosgene was added at 80 grams/minute for a total addition of about 2,200 grams. A solution of p-cumylphenol (135 grams in 250 milliliters of methylene chloride) was added to the reaction mixture after addition of 220 grams of phosgene and continuing for about 11 minutes. A 33 weight percent aqueous solution of sodium hydroxide was added as needed during the phosgenation to maintain a pH of 9-10. Then, an additional 200 grams of phosgene were added while the pH was maintained with aqueous sodium hydroxide. The reactor was then purged with nitrogen and its contents transferred to a 100 liter work-up tank. The reaction mixture was purified on a centrifuge train where the brine phase was separated and the organic phase (including product polymer and methylene chloride) was extracted with aqueous hydrochloric acid and then washed with deionized water to remove ionic chlorides. The polymer was steam-precipitated from the resulting methylene chloride solution, and the precipitated polymer was dried under hot nitrogen. The p-cumylphenol amount was chosen to achieve a target weight average molecular weight of 37,000 to 38,500 grams/mole. A skilled person can adjust the p-cumylphenol amount to achieve a different target molecular weight.

Except for ABS CF and ABS GF, which required no compounding, compositions were compounded on a Coperion ten-barrel twin-screw extruder operating at 150 rotations per minute, a throughput of 50 kilograms/hour, a die temperature of 299° C., and barrel temperatures of 299° C. All components were added to the feed throat of the extruder. The extrudate was cooled on a moving belt using water spray, then pelletized. Pellets were dried in an oven at 100° C. for at least 4 hours before use for preparation of test articles.

TABLE 1

| Component | Description |
|---|---|
| PC 1 | para-Cumylphenol endcapped bisphenol A polycarbonate having 0 mole percent branching and a weight average molecular weight of about 35,000 grams/mole. |
| PC 2 | para-Cumylphenol endcapped bisphenol A polycarbonate incorporating the branching agent 1,1,1-tris(4-hydroxyphenyl)ethane (THPE), and having 0.4 mole percent branching and a weight average molecular weight of about 37,000 grams/mole. |
| PC 3 | para-Cyanophenol endcapped bisphenol A polycarbonate incorporating THPE branching agent, and having 3.0 mole percent branching and a weight average molecular weight of about 30,000 grams/mole. |
| PC 4 | para-Cumylphenol endcapped bisphenol A polycarbonate having 0 mole percent branching and a weight average molecular weight of about 30,000 grams/mole. |
| PC-Si | para-Cumylphenol endcapped polycarbonate-polysiloxane in which the polysiloxane blocks comprise, on average, about 10 dimethylsiloxane units per block, with the endcapped block polycarbonate-polysiloxane as a whole incorporating about 20 weight percent polysiloxane and having a weight average molecular weight of about 30,000 grams/mole; preparable by the general procedure of paragraphs [0061] to [0064] of International Patent Application Publication No. WO 2017/019969 A1 of Hoover et al. |
| ABS CF | A blend of 80 weight percent Acrylonitrile-Butadiene-Styrene copolymer (ABS), CAS Reg. No. 9003-56-9, and 20 weight percent carbon fiber, the ABS having a melt flow rate of 5.6 grams/10 minutes measured according to ASTM D1238-13 at 230° C. and 3.8 kilogram force; obtained from SABIC as LNP ™ THERMOCOMP ™ AM COMPOUND AC004XXAR1. |
| ABS GF | A blend of 80 weight percent Acrylonitrile-Butadiene-Styrene copolymer (ABS), CAS Reg. No. 9003-56-9, and 20 weight percent glass fiber, the ABS having a melt flow rate of 5.6 grams/10 minutes measured according to ASTM D1238-13 at 230° C. and 3.8 kilogram force; obtained from SABIC as LNP ™ THERMOCOMP ™ AM COMPOUND AF004XXAR1. |
| PETS | Pentaerythritol tetrastearate, CAS Reg. No. 115-83-3. |
| Stabilizer 1 | tris(2,4-di-tert-Butylphenyl)phosphite, CAS Reg. No. 31570-04-4; obtained from BASF as IRGAFOS ™ 168. |
| Stabilizer 2 | bis(2,4-Dicumylphenyl)pentaerythritol diphosphite, CAS Reg. No. 154862-43-8, obtained from Dover Chemical Corporation as DOVERPHOS ™ S-9228 Phosphite Antioxidant. |
| Antioxidant | Octadecyl 3-(3,5-di-tert-butyl-4-hydroxyphenyl)propionate, CAS Reg. No. 2082-79-3, obtained from BASF as IRGANOX ™ 1076. |

Compositions are summarized in Table 2, where component amounts are expressed in parts by weight per 100 parts by weight resin. In Table 2, "Avg. branching (mol %)" is the average mole percent branching for the entire composition, which is expressed in units of mole percent and calculated as 100 times moles of branched carbonate units in the branched polycarbonate divided by the sum of moles of linear carbonate units in the branched polycarbonate and moles of linear carbonate units in any linear carbonate-containing polymer. As an illustration, average mole percent branching for Example 4 is calculated as follows.

$$\text{avg\_mol \%\_branching} = \frac{100 \times 0.3885 \times 0.03}{(0.3885 \times 0.97 + 0.3885 \times 1.00 + 0.223 \times 0.80)}$$

$$= 1.1655 / (0.37685 + 0.3885 + 0.1784)$$

$$= 1.23$$

A large format additive manufacturing machine (BAAM™, manufactured by Cincinnati Inc.) was used to print box-shaped parts in which box walls had a length of 2.44 meters (96 inches), a height of 55.9 centimeters (22 inches), and a width of 15.24 centimeters (6 inches). The melt pressure was kept below 13.8 megapascals (2000 psi). For Comparative Example 1, the molten form of the composition had a temperature of 265° C., which was 111° C. greater than the glass transition temperature of 154° C.; for Example 1, the molten form temperature was 262° C., or 108° C. greater than the glass transition temperature of 154° C.; for Example 2, the molten form temperature was 240° C., or 87° C. greater than the glass transition temperature of 153° C.; for Example 3, the molten form temperature was 235° C., or 84° C. greater than the glass transition temperature of 151° C.; for Comparative Example 2, the molten form temperature was 215° C., or 72° C. greater than the glass transition temperature of 143° C. For Comparative Examples 3-6, and Examples 4-6, differences between glass transition temperatures and molten form temperatures were similar to those for Comparative Examples 1 and 2, and Examples 1-3. During printing, the upper surface of the underlying layer receiving the deposited molten extrusion had a temperature approximately 40 to 60° C. above the glass transition temperature of the composition.

With one exception, box-shaped parts could be printed from all compositions tested, which means that all but one of compositions exhibited adequate rapid dimensional stability. The exception was Comparative Example 1, with linear polycarbonate, for which printed layers exhibited sagging.

From the box-shaped parts, dumbbell-shaped tensile bars having dimensions specified by ASTM D638-14 were machined using a computer numerical control (CNC) water-jet cutter. For each example, the box-shaped parts were used to create tensile bars having two orientations: horizontal or X-direction, with the printed beads parallel to the tensile axis, and vertical or Z-direction, with the printed beads perpendicular to the tensile axis. FIG. 1 illustrates the orientations of tensile property test specimens 1 relative to the printed article 2 from which they are cut.

The tensile bars were annealed in an oven at 85° C. for 30 min, then conditioned at drying conditions, followed by a normalization period at 21° C. and about 50% relative humidity for at least one hour before testing. An MTS EXCEED' E45 electromechanical load frame was used to strain the samples, at a rate of 5 millimeters/minute, in tension mode up to fracture. The force-displacement data were collected for further analysis. Property averages and standard deviations are based on testing of five samples for each combination of composition and sample orientation. Tensile strength at break and tensile modulus were determined according to ASTM D638-14 at 19-21° C. In Table 2, tensile strength values are expressed in units of megapascals (MPa), and tensile modulus values are expressed in units of gigapascals (GPa).

Tensile property results are presented in Table 2, where "Tens. str. 100×(Z/X)" is 100 times the ratio of Z-direction tensile strength to X-direction tensile strength. In the Table 2 properties for Comparative Example 2, in which the composition had 3.09 mole percent branching, "N/A" means that the Z-direction tensile properties could not be determined because the test sample could not be secured in the tensile test machine without breaking. The tensile strength results for Comparative Examples 5 and 6, which are ABS compositions containing carbon fiber and glass fiber respectively, illustrate the problem of poor interlayer adhesion in fiber-filled thermoplastics. Specifically, for those compositions, tensile strength values were greater in the X-direction, where force was applied parallel to the layers, than they were in the Z-direction, where force was applied perpendicular to the layers.

The results for polycarbonate-containing examples show (1) for five of the five comparative examples, in which the composition had an average mole percent branching of less than 0.06 or greater than 2.2, Z-direction tensile strength was less than X-direction tensile strength; and (2) for four of the six inventive compositions, in which the composition had an average mole percent branching in the range 0.06 to 2.4, Z-direction tensile strength was greater than X-direction tensile strength. This indicates that interlayer adhesion was generally greater for the inventive examples than for the comparative examples.

TABLE 2

| | C. Ex. 1 | Ex. 1 | Ex. 2 | Ex. 3 | C. Ex. 2 |
|---|---|---|---|---|---|
| COMPOSITIONS | | | | | |
| PC1 | 100 | 50 | 0 | 50 | 0 |
| PC2 | 0 | 50 | 100 | 0 | 0 |
| PC3 | 0 | 0 | 0 | 50 | 100 |
| PC4 | 0 | 0 | 0 | 0 | 0 |
| PC-Si | 0 | 0 | 0 | 0 | 0 |
| PCE-Si 1 | 0 | 0 | 0 | 0 | 0 |
| PCE-Si 2 | 0 | 0 | 0 | 0 | 0 |
| PEI | 0 | 0 | 0 | 0 | 0 |
| ABS CF | 0 | 0 | 0 | 0 | 0 |
| ABS GF | 0 | 0 | 0 | 0 | 0 |
| PETS | 0 | 0 | 0 | 0 | 0 |
| Stabilizer 1 | 0.06 | 0.06 | 0.06 | 0.013 | 0.013 |
| Stabilizer 2 | 0 | 0 | 0 | 0.017 | 0.017 |
| Antioxidant | 0 | 0 | 0 | 0.05 | 0.05 |
| Avg. branching (mol %) | 0.00 | 0.20 | 0.40 | 1.52 | 3.09 |
| PROPERTIES | | | | | |
| Tens. str., X-dir. (MPa) | 75.9 | 55.6 | 64.2 | 64.5 | 18.0 |
| std. dev. | 11.6 | 2.0 | 1.6 | 1.0 | 4.2 |
| Tens. str., Z-dir. (MPa) | 60.9 | 67.3 | 64.7 | 68.7 | N/A |
| std. dev. | 15 | 9.1 | 2.0 | 3.3 | N/A |
| Tens. str. 100x(Z/X) | 80.2 | 121.0 | 100.8 | 106.5 | — |
| Tens. mod., X-dir. (GPa) | 3.18 | 1.89 | 2.25 | 2.15 | 2.06 |
| std. dev. | 0.4 | 0.04 | 0.41 | 0.04 | 0.01 |
| Tens. mod., Z-dir. (GPa) | 2.72 | 2.06 | 2.8 | 2.27 | N/A |
| std. dev. | 0.18 | 0.3 | 0.03 | 0.03 | N/A |

| | C. Ex. 3 | Ex. 4 | C. Ex. 4 | C. Ex. 5 | Ex. 5 |
|---|---|---|---|---|---|
| COMPOSITIONS | | | | | |
| PC1 | 0 | 0 | 0 | 77.7 | 38.85 |
| PC2 | 0 | 0 | 0 | 0 | 38.85 |
| PC3 | 0 | 38.85 | 77.7 | 0 | 0 |
| PC4 | 77.7 | 38.85 | 0 | 0 | 0 |
| PC-Si | 22.3 | 22.3 | 22.3 | 22.3 | 22.3 |
| PCE-Si 1 | 0 | 0 | 0 | 0 | 0 |
| PCE-Si 2 | 0 | 0 | 0 | 0 | 0 |
| PEI | 0 | 0 | 0 | 0 | 0 |
| ABS CF | 0 | 0 | 0 | 0 | 0 |
| ABS GF | 0 | 0 | 0 | 0 | 0 |
| PETS | 0.3 | 0.3 | 0.3 | 0.3 | 0.3 |
| Stabilizer 1 | 0.013 | 0.013 | 0.013 | 0.08 | 0.08 |
| Stabilizer 2 | 0.017 | 0.017 | 0.017 | 0 | 0 |
| Antioxidant | 0.05 | 0.05 | 0.05 | 0 | 0 |
| Avg. branching (mol %) | 0.00 | 1.23 | 2.50 | 0.00 | 0.16 |
| PROPERTIES | | | | | |
| Tens. str., X-dir. (MPa) | 57.1 | 58.2 | 62.2 | 58.6 | 54.0 |
| std. dev. | 0.4 | 2.1 | 1.2 | 2.7 | 1.1 |
| Tens. str., Z-dir. (MPa) | 56.7 | 53.7 | 51.2 | 54.3 | 54.6 |
| std. dev. | 0.2 | 3.3 | 12.4 | 3.8 | 1.1 |
| Tens. str. 100 x(Z/X) | 99.3 | 92.3 | 82.3 | 92.7 | 101.1 |
| Tens. mod., X-dir. (GPa) | 1.71 | 1.96 | 1.88 | 1.68 | 1.70 |
| std. dev. | 0.02 | 0.04 | 0.03 | 0.01 | 0.02 |
| Tens. mod., Z-dir. (GPa) | 1.71 | 1.96 | 1.88 | 1.68 | 1.7 |
| std. dev. | 0.02 | 0.04 | 0.03 | 0.01 | 0.02 |

| | Ex. 6 | C. Ex. 6 | C. Ex. 7 |
|---|---|---|---|
| COMPOSITIONS | | | |
| PC1 | 0 | 0 | 0 |
| PC2 | 77.7 | 0 | 0 |

TABLE 2-continued

| | | | |
|---|---|---|---|
| PC3 | 0 | 0 | 0 |
| PC4 | 0 | 0 | 0 |
| PC-Si | 22.3 | 0 | 0 |
| PCE-Si 1 | 0 | 0 | 0 |
| PCE-Si 2 | 0 | 0 | 0 |
| PEI | 0 | 0 | 0 |
| ABS CF | 0 | 100 | 0 |
| ABS GF | 0 | 0 | 100 |
| PETS | 0.3 | 0 | 0 |
| Stabilizer 1 | 0.08 | 0 | 0 |
| Stabilizer 2 | 0 | 0 | 0 |
| Antioxidant | 0 | 0 | 0 |
| Avg. branching (mol %) | 0.33 | — | — |
| PROPERTIES | | | |
| Tens. str., X-dir. (MPa) | 53.5 | 57.4 | 39.8 |
| std. dev. | 1.9 | — | — |
| Tens. str., Z-dir. (MPa) | 47.6 | 14.3 | 18.0 |
| std. dev. | 2.7 | — | — |
| Tens. str. 100x(Z/X) | 89.0 | 24.9 | 45.2 |
| Tens. mod., X-dir. (GPa) | 1.81 | — | — |
| std. dev. | 0.04 | — | — |
| Tens. mod., Z-dir. (GPa) | 1.81 | — | — |
| std. dev. | 0.04 | — | — |

Components used to prepare a second set of compositions are summarized in Table 3. Polymer molecular weights were determined by gel permeation chromatography using bisphenol A polycarbonate standards.

TABLE 3

| Component | Description |
|---|---|
| PC 5 | para-Cumylphenol endcapped bisphenol A polycarbonate having 0 mole percent branching and a weight average molecular weight of about 22,000 grams/mole. |
| PC 6 | para-Cumylphenol endcapped bisphenol A polycarbonate incorporating the branching agent 1,1,1-tris(4-hydroxyphenyl)ethane (THPE) and having 0.4 mole percent branching and a weight average molecular weight of about 36,700 grams/mole. |
| Stabilizer 1 | tris(2,4-di-tert-Butylphenyl) phosphite, CAS Reg. No. 31570-04-4; obtained from BASF as IRGAFOS ™ 168. |
| UVA | 2-(2'-Hydroxy-5'-tert-octylphenyl)benzotriazole, CAS Reg. No. 123307-21-1. |

Compositions are summarized in Table 4, where component amounts are expressed in units of weight percent based on the total weight of the composition.

TABLE 4

| | Ex. 7 | Ex. 8 | Ex. 9 |
|---|---|---|---|
| PC 5 | 29.93 | 49.77 | 79.77 |
| PC 6 | 69.84 | 50.00 | 20.00 |
| Stabilizer 1 | 0.03 | 0.03 | 0.03 |
| UVA | 0.20 | 0.20 | 0.20 |
| Avg. branching (mol %) | 0.28 | 0.20 | 0.08 |

Compositions were prepared in a compounding extruder to form pellets. ASTM tensile bars and Izod bars were injection molded on an 80 T Van Dorn molding machine with a set temperature of approximately 290° C. All tensile and Izod bars were conditioned at 23° C. and 50% relative humidity for at least 1 day before testing. Tensile testing was conducted at 23° C. on Type I bars according to ASTM D638-14 at a speed of 5 millimeters/minute. Five bars were tested for each composition. Tensile elongation at break values are expressed in units of percent (%). Notched Izod impact strength (NII) testing was conducted on 75 millimeter×12.5 millimeter×3.2 millimeter bars according to ASTM D256-10e1 at 23° C. with a pendulum energy of 5 pound-force/foot. Bars were notched after conditioning, and 5 bars were tested for each composition. Notched Izod impact strength values are expressed in units of joules/meter (J/m). Flexural modulus and flexural stress at yield were determined according to ASTM D790-17 at 23° C. Flexural modulus values and flexural stress at yield values are expressed in units of megapascals (MPa).

Melt flow rate values were determined according to ASTM D1238-13 using a temperature of 300° C. and a load of 1.2 kilograms. Glass transition temperature ($T_g$) values were determined according to ASTM D3418-15 using differential scanning calorimetry and a heating rate of 20° C./minute.

Thermal properties and physical properties determined for injection molded test parts are summarized in Table 5. As expected, higher average mole percent branching values were associated with lower melt flow rates. The glass transition temperatures of the three compositions were similar, and mechanical properties for injection molded test articles were comparable for the three compositions.

TABLE 5

| | Ex. 7 | Ex. 8 | Ex. 9 |
|---|---|---|---|
| Avg. branching (mol %) | 0.28 | 0.20 | 0.08 |
| MFR (g/10 min) | 6 | 9 | 19 |
| Tg (° C.) | 151 | 150 | 148 |
| Flexural modulus (MPa) | 2390 | 2400 | 2400 |
| Flexural stress at yield (MPa) | 99 | 99 | 98 |
| Notched Izod impact strength (J/m) | 822 | 816 | 765 |
| ductile failure (percent of samples) | 100 | 100 | 100 |
| Tensile modulus (GPa) | 2.20 | 2.22 | 2.23 |
| Tensile strength at break (MPa) | 65 | 60 | 58 |
| Tensile elongation at break (%) | 106 | 100 | 94 |

Figure 2:
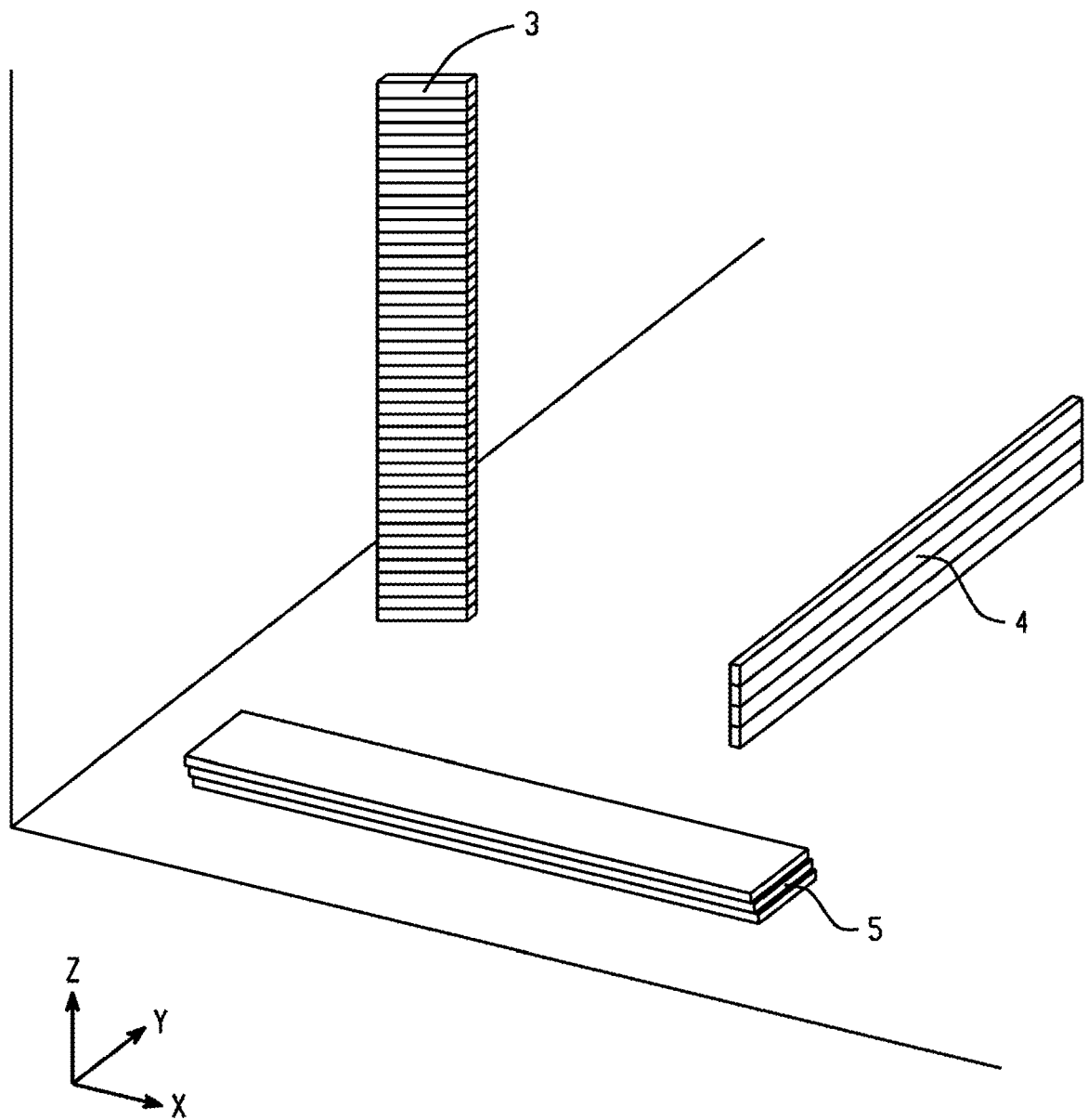
FIG. 2 illustrates print (layer) orientations for exemplary test articles useful for determining tensile properties and Izod impact strengths.

Pellets were extruded into filament about 1.77 millimeters in diameter. The spooled filaments were dried to less than 0.04 weight percent moisture before use for fused filament fabrication. A commercially available filament prepared from linear bisphenol A polycarbonate was used as a control (Comparative Example 8). Fused filament fabrication utilized a MakerBot™ Replicator 2× with a nozzle/print head temperature of 320° C. and base plate temperature of 200° C. Test articles were directly printed (rather than being cut from a larger printed object) by printing alternating layers in 45/−45 degree criss-cross orientations. In this configuration, strands of extrudate were laid in a diagonal pattern with each layer crossing over at a 90 degree angle from the previous layer. MakerBot™ tensile bars showed warpage from the build plate and were tested manually. FIG. 2 illustrates different sample orientations for ASTM tensile and Izod bars. The orientations are named relative to the Z-direction: the orientation labeled 3 has an XZ or "upright" orientation; the orientation labeled 4 has a YZ or "on-edge" orientation and; and the orientation labeled 5 has an XY or "flat" orientation. For these experiments, tensile and Izod bars were printed in the flat orientation.

Results are presented in Table 6. The results show, first, that notched Izod impact strength values were lower for 3D printed parts than for injection molded parts having the same composition. However, focusing just on 3D printed parts, notched Izod impact strength values were roughly two to three times greater for Examples 7-9, for which the compositions had average mole percent branching values in the range 0.08 to 0.28, than they were for Comparative Example 7, for which the composition had zero mole percent branching. For tensile elongation at break, values were greater for injection molded parts than for printed parts having the same composition, but those differences were not nearly as great as for notched Izod impact strengths. For printed parts, tensile elongation at break values increased with increasing average mole percent branching. In contrast, tensile modulus values and tensile strength values were relatively insensitive to average mole percent branching.

TABLE 6

|  | Injection Molded | | | | 3D Printed | | | |
| --- | --- | --- | --- | --- | --- | --- | --- | --- |
|  | C. Ex. 8 | Ex. 7 | Ex. 8 | Ex. 9 | C. Ex. 8 | Ex. 7 | Ex. 8 | Ex. 9 |
| Avg. branching (mol %) | 0 | 0.28 | 0.20 | 0.08 | 0 | 0.28 | 0.20 | 0.08 |
| NII (J/m) | 917 | 822 | 816 | 765 | 111 | 339 | 354 | 218 |
| ductile failure (% of samples) | 100 | 100 | 100 | 100 | 0 | 40 | 40 | 20 |
| Tensile modulus (GPa) | 2.28 | 2.20 | 2.22 | 2.23 | 3.01 | 3.02 | 2.77 | 2.88 |
| Tensile strength at break (MPa) | 53 | 65 | 60 | 58 | 45 | 51 | 50 | 47 |
| Tensile elong. at break (%) | 99 | 106 | 100 | 94 | 16 | 52 | 49 | 28 |

Components used to prepare a third set of compositions are summarized in Table 7.

TABLE 7

| Component | Description |
| --- | --- |
| PC 6 | para-Cumylphenol endcapped bisphenol A polycarbonate incorporating the branching agent 1,1,1-tris(4-hydroxyphenyl)ethane (THPE) and having 0.4 mole percent branching and a weight average molecular weight of about 36,700 grams/mole. |
| PC 7 | 4-Hydroxybenzonitrile endcapped bisphenol A polycarbonate branching incorporating the branching agent 1,1,1-tris(4-hydroxyphenyl)ethane (THPE), and having 3 mole percent branching, and a weight average molecular weight of about 30,000 grams/mole. |
| PC 8 | para-Cumylphenol endcapped bisphenol A polycarbonate having 0 mole percent branching and a weight average molecular weight of about 29,000 grams/mole. |
| PC 9 | para-Cumylphenol endcapped bisphenol A polycarbonate having 0 mole percent branching and a weight average molecular weight of about 35,000 grams/mole. |
| PC-Si | para-Cumylphenol endcapped block copolymer with polycarbonate blocks containing bisphenol A carbonate units and polysiloxane blocks containing dimethylsiloxane units, the end-capped polydimethylsiloxane macromer having an average of about 45 dimethylsiloxane units per molecule; the copolymer having a weight average molecular weight of 28,000-32,000 grams/mole and a polysiloxane content of about 20 weight percent; preparable according to the procedure of paragraphs [0061] to [0064] of International Patent Application Publication No. WO 2017/019969 A1 of Hoover et al. |
| Stabilizer 1 | tris(2,4-di-tert-Butylphenyl) phosphite, CAS Reg. No. 31570-04-4; obtained from BASF as IRGAFOS ™ 168. |
| Stabilizer 2 | bis(2,4-di-Cumylphenyl)pentaerythritol diphosphite, CAS Reg. No. 154862-43-8, obtained from Dover Chemical Corporation as DOVERPHOS S-9228 Phosphite Antioxidant. |
| Antioxidant | Octadecyl 3-(3,5-di-tert-butyl-4-hydroxyphenyl)propionate, CAS Reg. No. 2082-79-3, obtained from BASF as IRGANOX ™ 1076. |
| PETS | Pentaerythritol tetrastearate, CAS Reg. No. 115-83-3. |

For Example 11-14, compositions are summarized in Table 8, where component amounts are expressed in units of weight percent, based on the total weight of the composition. For these compositions, monofilaments were prepared using a Fiber Extrusion Technology FET extrusion machine. Extrusion conditions were optimized based on the glass transition temperature of the resin composition. The resulting filaments had a diameter of about 1.79 millimeters.

Monofilaments were used to print test articles by a fused filament fabrication process on a STRATASYS FORTUS™ 900mc 3D Printer using the PC profile with a model temperature of 345° C., an oven temperature of about 145° C., a tip size of 0.406 millimeter (0.016 inch; T16), a layer thickness (resolution) of 0.254 millimeter (0.010 inch; T16), a contour and raster width of 0.508 millimeter (0.020 inch), a precision of +/−0.13 millimeter (+/−0.005 inch) or +/−0.0015 millimeter/millimeter (+/−0.0015 inch/inch), and an air gap of 0.0000 millimeter (0.0000 inch).

For each composition, ASTM tensile bars and Izod bars were printed in upright, on-edge, and flat orientations. Tensile properties were determined at 23° C. according to ASTM D638-14 at a test speed of 5 millimeters/minute. Notched Izod impact strengths were determined at 23° C. according to ASTM D256-10e1 with a pendulum energy of 2.75 joules (2 foot-pounds). Results are presented in Table 8, where reported values are averages based on testing of five samples for each combination of composition and sample orientation. In Table 8, "100×(Z/X)" is 100 times the ratio of Z-direction (upright) tensile strength to X-direction (flat) tensile strength. For each of Examples 10, 11, and 12, in which the compositions had average mole percent branching values ranging from 0.15 to 1.16, tensile strength values were similar in flat, on-edge, and upright orientations. This demonstrates that tensile strength in the upright orientation was not compromised relative to tensile strengths in flat and on-edge orientations, indicating that interlayer adhesion was good. The Example 10 composition with an average mole percent branching of 1.23%, exhibited an especially good combination of tensile properties and notched Izod impact strength.

TABLE 8

|  | Ex. 10 | C. Ex. 9 | Ex. 11 | Ex. 12 |
|---|---|---|---|---|
| COMPOSITIONS | | | | |
| PC 6 | 0 | 0 | 38.70 | 77.41 |
| PC 7 | 38.70 | 77.41 | 0 | 0 |
| PC 8 | 38.70 | 0 | 0 | 0 |
| PC 9 | 0 | 0 | 38.70 | 0 |
| PC-Si | 22.22 | 22.22 | 22.22 | 22.22 |
| Stabilizer 1 | 0.01 | 0.01 | 0.08 | 0.08 |
| Stabilizer 2 | 0.02 | 0.02 | 0 | 0 |
| Antioxidant | 0.05 | 0.05 | 0 | 0 |
| PETS | 0.30 | 0.30 | 0.30 | 0.30 |
| Avg. branching (mol %) | 1.23 | 2.50 | 0.16 | 0.33 |
| PROPERTIES | | | | |
| Tensile strength at break (MPa) | | | | |
| Flat | 44 | 51 | 38 | 38 |
| On-edge | 45 | 51 | 41 | 42 |
| Upright | 44 | 43 | 40 | 42 |
| 100x(upright/flat) | 100 | 84 | 105 | 111 |
| Tensile modulus (GPa) | | | | |
| Flat | 1.66 | 2.00 | 1.51 | 1.54 |
| On-edge | 1.83 | 2.02 | 1.70 | 1.71 |
| Upright | 1.81 | 2.06 | 1.78 | 1.77 |
| Tensile elongation at break (%) | | | | |
| Flat | 6.9 | 5.3 | 5.7 | 5.7 |
| On-edge | 4.3 | 4.0 | 4.6 | 4.7 |
| Upright | 3.2 | 2.5 | 3.0 | 3.1 |
| Notched Izod Impact Strength (J/m) | | | | |
| Flat | 200 | 160 | 260 | 249 |
| On-edge | 226 | 172 | 257 | 260 |
| Upright | 94 | 54 | 84 | 83 |

The invention includes at least the following aspects.

Aspect 1: An article, comprising: at least two contiguous layers; wherein the at least two contiguous layers comprise a composition comprising, based on the total weight of the composition, 10 to 100 weight percent of a branched polycarbonate; 0 to 90 weight percent of a linear carbonate-containing polymer selected from the group consisting of linear polycarbonates, linear polycarbonate-polysiloxanes, and combinations thereof; and 0 to less than 5 weight percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

Aspect 2: The article of aspect 1, wherein the composition comprises the branched polycarbonate and the linear carbonate-containing polymer.

Aspect 3: The article of aspect 1 or 2, wherein the composition comprises 95 to 100 weight percent total of the branched polycarbonate and the linear carbonate-containing polymer.

Aspect 4: The article of any one of aspects 1-3, wherein the composition is characterized by an average mole percent branching of 0.06 to 2 mole percent.

Aspect 5: The article of any one of aspects 1-4, wherein the composition comprises 0 to 1 weight percent filler.

Aspect 6: The article of aspect 1, wherein the composition comprises the branched polycarbonate and the linear polycarbonate; the composition comprises 95 to 100 weight percent total of the branched polycarbonate and the linear polycarbonate; the composition is characterized by an average mole percent branching of 0.06 to 2 mole percent; and the composition comprises 0 to 1 weight percent filler.

Aspect 7: The article of aspect 1, wherein the composition comprises the branched polycarbonate, the linear polycarbonate, and the linear polycarbonate-polysiloxane; the composition comprises 95 to 100 weight percent total of the branched polycarbonate, the linear polycarbonate, and the linear polycarbonate-polysiloxane; the composition is characterized by an average mole percent branching of 0.06 to 2 mole percent; and the composition comprises 0 to 1 weight percent filler.

Aspect 8: A method of additive manufacturing, the method comprising: converting a composition from a solid form to a molten form, wherein the composition is characterized by a glass transition temperature, and the molten form has a temperature 70 to 250° C. above the glass transition temperature; extruding the molten form to form a first molten extrusion; depositing the first molten extrusion in a predetermined pattern to form a first layer; further extruding the molten form to form a second molten extrusion; and depositing the second molten extrusion in a predetermined pattern to form a second layer having a lower surface in contact with an upper surface of the first layer, wherein the composition comprises, based on the total weight of the composition, 10 to 100 weight percent of a branched polycarbonate; 0 to 90 weight percent of a linear carbonate-containing polymer selected from the group consisting of linear polycarbonates, linear polycarbonate-polysiloxanes, and combinations thereof; and 0 to less than 5 weight percent filler; wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and moles of linear carbonate units in the linear carbonate-containing polymer; wherein the composition comprises 70 to 100 weight percent total of the branched polycarbonate and the linear carbonate-containing polymer; and wherein the composition has a melt flow rate of 1 to 20 grams per 10 minutes, determined according to ASTM D1238-13 at 300° C. and 1.2 kilogram load.

Aspect 9: The method of aspect 8, wherein the upper surface of the first layer has a temperature 20 to 200° C. above the glass transition temperature during the depositing the second molten extrusion.

Aspect 10: The method of aspect 8 or 9, wherein the composition is characterized by an average mole percent branching of 0.06 to 2 mole percent.

Aspect 11: The method of any one of aspects 8-10, wherein the composition comprises 95 to 100 weight percent total of the branched polycarbonate and the linear carbonate-containing polymer.

Aspect 12: The method of any of aspects 8-11, wherein the composition comprises 0 to 1 weight percent filler.

Aspect 13: The method of aspect 8, wherein the composition comprises the branched polycarbonate and the linear polycarbonate; the composition comprises 95 to 100 weight percent total of the branched polycarbonate and the linear polycarbonate; the composition is characterized by an average mole percent branching of 0.06 to 2 mole percent; and the composition comprises 0 to 1 weight percent filler.

Aspect 14: The method of aspect 8, wherein the composition comprises the branched polycarbonate, the linear polycarbonate, and the linear polycarbonate-polysiloxane; the composition comprises 95 to 100 weight percent total of the branched polycarbonate, the linear polycarbonate, and the linear polycarbonate-polysiloxane; the composition is characterized by an average mole percent branching of 0.06 to 2 mole percent; and the composition comprises 0 to 1 weight percent filler.

The invention claimed is:

1. An article, comprising:
    at least two contiguous layers;
    wherein the at least two contiguous layers comprise a composition comprising, based on the total weight of the composition,
        10 to 100 weight percent of a branched polycarbonate;
        0 to 90 weight percent of a linear carbonate-containing polymer selected from the group consisting of linear polycarbonates, linear polycarbonate-polysiloxanes, and combinations thereof; and
        0 to less than 5 weight percent filler;
    wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and the linear carbonate-containing polymer;
    wherein the composition comprises 70 to 100 weight percent total of the branched polycarbonate and the linear carbonate-containing polymer; and
    wherein the composition has a melt flow rate of 1 to 20 grams per 10 minutes, determined according to ASTM D1238-13 at 300° C. and 1.2 kilogram load.

2. The article of claim 1, wherein the composition comprises the branched polycarbonate and the linear carbonate-containing polymer.

3. The article of claim 1, wherein the composition comprises 95 to 100 weight percent total of the branched polycarbonate and the linear carbonate-containing polymer.

4. The article of claim 1, wherein the composition is characterized by an average mole percent branching of 0.06 to 2 mole percent.

5. The article of claim 1, wherein the composition comprises 0 to 1 weight percent filler.

6. The article of claim 1, wherein
    the composition comprises the branched polycarbonate and the linear polycarbonate;
    the composition comprises 95 to 100 weight percent total of the branched polycarbonate and the linear polycarbonate;
    the composition is characterized by an average mole percent branching of 0.06 to 2 mole percent; and
    the composition comprises 0 to 1 weight percent filler.

7. The article of claim 1, wherein
    the composition comprises the branched polycarbonate, the linear polycarbonate, and the linear polycarbonate-polysiloxane;
    the composition comprises 95 to 100 weight percent total of the branched polycarbonate, the linear polycarbonate, and the linear polycarbonate-polysiloxane;
    the composition is characterized by an average mole percent branching of 0.06 to 2 mole percent; and
    the composition comprises 0 to 1 weight percent filler.

8. A method of additive manufacturing, the method comprising:
    converting a composition from a solid form to a molten form, wherein the composition is characterized by a glass transition temperature, and the molten form has a temperature 70 to 250° C. above the glass transition temperature;
    extruding the molten form to form a first molten extrusion;
    depositing the first molten extrusion in a predetermined pattern to form a first layer;
    further extruding the molten form to form a second molten extrusion; and
    depositing the second molten extrusion in a predetermined pattern to form a second layer having a lower surface in contact with an upper surface of the first layer,
    wherein the composition comprises, based on the total weight of the composition,
        10 to 100 weight percent of a branched polycarbonate;
        0 to 90 weight percent of a linear carbonate-containing polymer selected from the group consisting of linear polycarbonates, linear polycarbonate-polysiloxanes, and combinations thereof; and
        0 to less than 5 weight percent filler;
    wherein the composition is characterized by an average mole percent branching of 0.06 to 2.4 mole percent, wherein the average mole percent branching is calculated as 100 times moles of branched carbonate units in the branched polycarbonate divided by the sum of moles of linear carbonate units in the branched polycarbonate and moles of linear carbonate units in the linear carbonate-containing polymer;
    wherein the composition comprises 70 to 100 weight percent total of the branched polycarbonate and the linear carbonate-containing polymer; and
    wherein the composition has a melt flow rate of 1 to 20 grams per 10 minutes, determined according to ASTM D1238-13 at 300° C. and 1.2 kilogram load.

9. The method of claim 8, wherein the upper surface of the first layer has a temperature 20 to 200° C. above the glass transition temperature during the depositing the second molten extrusion.

10. The method of claim 8, wherein the composition is characterized by an average mole percent branching of 0.06 to 2 mole percent.

11. The method of claim 8, wherein the composition comprises 95 to 100 weight percent total of the branched polycarbonate and the linear carbonate-containing polymer.

12. The method of claim 8, wherein the composition comprises 0 to 1 weight percent filler.

13. The method of claim 8, wherein
    the composition comprises the branched polycarbonate and the linear polycarbonate;
    the composition comprises 95 to 100 weight percent total of the branched polycarbonate and the linear polycarbonate;
    the composition is characterized by an average mole percent branching of 0.06 to 2 mole percent; and
    the composition comprises 0 to 1 weight percent filler.

14. The method of claim 8, wherein
    the composition comprises the branched polycarbonate, the linear polycarbonate, and the linear polycarbonate-polysiloxane;
    the composition comprises 95 to 100 weight percent total of the branched polycarbonate, the linear polycarbonate, and the linear polycarbonate-polysiloxane;

the composition is characterized by an average mole percent branching of 0.06 to 2 mole percent; and the composition comprises 0 to 1 weight percent filler.

* * * * *